United States Patent [19]
Solberg et al.

[11] Patent Number: 5,085,535
[45] Date of Patent: Feb. 4, 1992

[54] LOCATING MECHANISM

[76] Inventors: Joseph R. Solberg, 1515 Wisconsin Ave., Little Chute, Wis. 54140; John B. Harvey, Rte. 2, New London, Wis. 54961

[21] Appl. No.: 684,880

[22] Filed: Apr. 12, 1991

[51] Int. Cl.⁵ .................................. F16D 1/00
[52] U.S. Cl. ................................ 403/24; 403/13; 403/344
[58] Field of Search .................... 403/344, 24, 13

[56] References Cited

U.S. PATENT DOCUMENTS

| Re. 32,693 | 6/1988 | Winfield | 403/344 X |
|---|---|---|---|
| 732,111 | 6/1903 | Perkins | 403/344 X |
| 744,917 | 11/1903 | Houldsworth | 403/344 |
| 772,634 | 10/1904 | Snyder | 403/344 X |
| 2,488,309 | 11/1949 | Mason | 403/344 X |
| 3,659,490 | 5/1972 | Buck | 403/399 X |
| 3,751,080 | 8/1973 | Bailey et al. | 403/344 |
| 3,889,553 | 6/1975 | Ballheimer | 403/344 X |
| 4,506,559 | 3/1985 | Fraucke et al. | 403/344 X |
| 4,637,807 | 1/1987 | Koelling | 403/344 X |

*Primary Examiner*—Andrew V. Kundrat
*Attorney, Agent, or Firm*—R. Jonathan Peters

[57] ABSTRACT

A locking or locating mechanism comprising first and second complementary, semi-circular metallic members, each of said members having two mating surfaces interengageable with two surfaces of the other member and cooperating for radial and axial alignment to form on engagement an open-ended cylindrical body having opposed cylindric surfaces and opposed marginal surfaces. For each half-member, one mating surface is the mirror image of the other. The first and second members are interengaged at the mating surfaces, and a bolt member interconnects the two members.

8 Claims, 3 Drawing Sheets

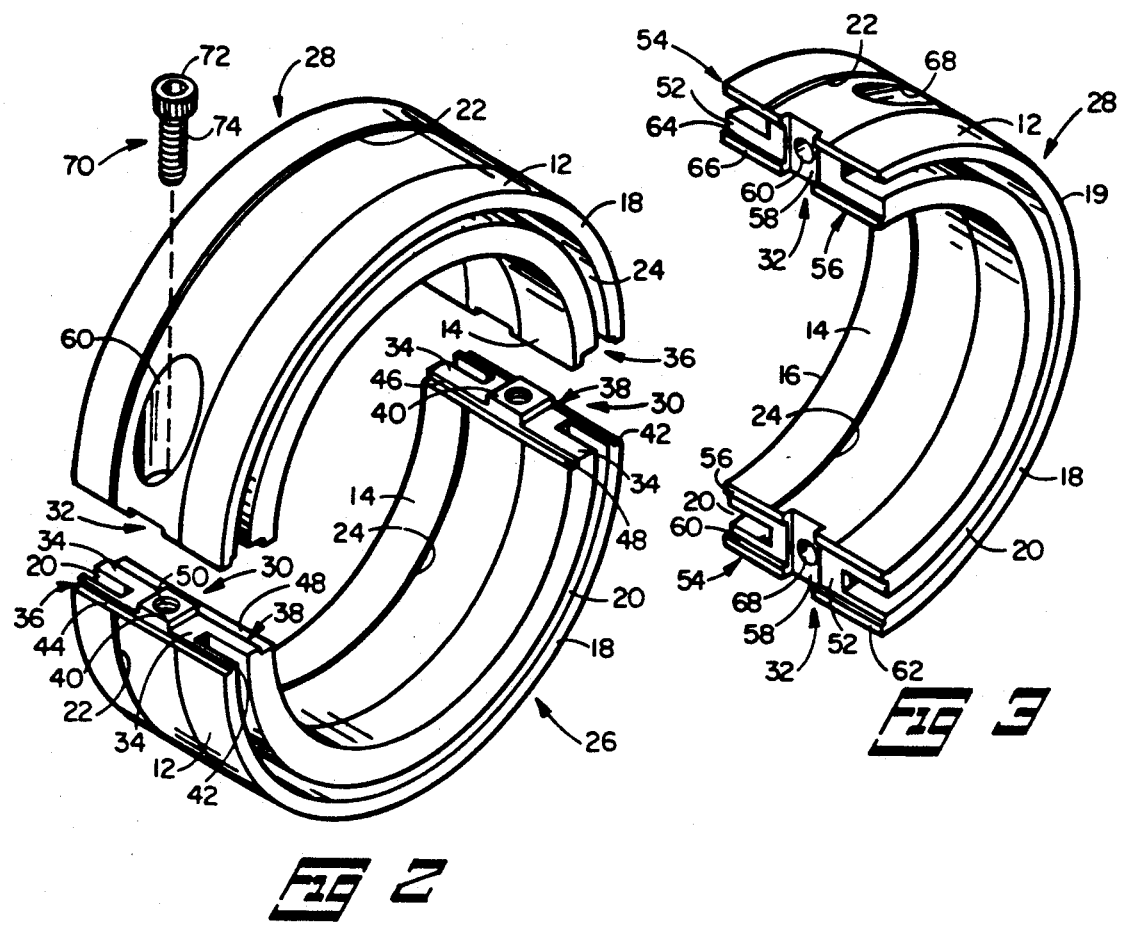
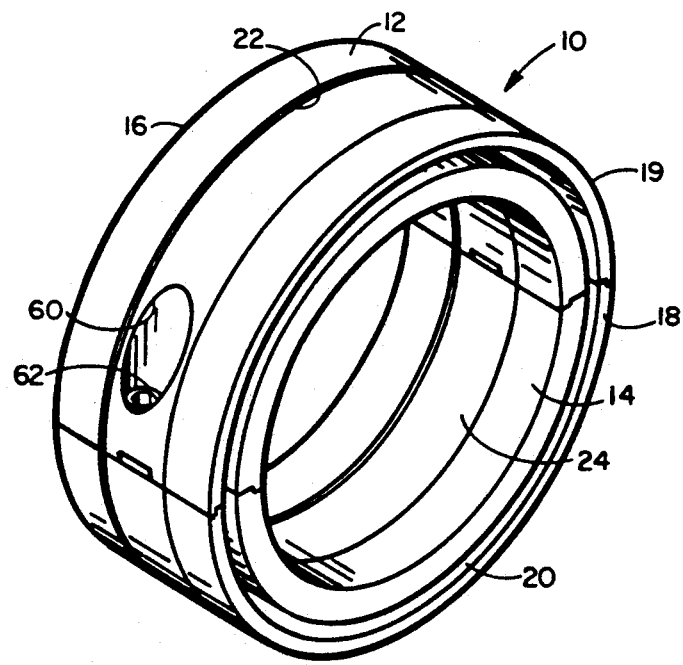

LOCATING MECHANISM

FIELD OF THE INVENTION

This invention relates to a locating mechanism, such as for a split bottom slitter, anvil, spacer and the like, used in the paper, film and foil industries and typically in combination with a knife or top slitter for slitting a wide web into a plurality of smaller individual packets or rolls.

BACKGROUND OF THE INVENTION

In the manufacture of goods and articles in the paper, film and foil industries, it is conventional to first form at the mill a wide web of the material, which can later be cut by the converter into smaller, individual rolls or packets. The web, typically provided as a roll, is passed continuously over the knife edge of a plurality of spaced apart slitters for slitting the web into a plurality of individual rolls, which are then wound on separate take-up rollers for packaging and shipping. In conventional practice, a bottom slitter or anvil is used in conjunction with a circular slitter having a sharp cutting edge and is typically known as a top slitter. In a conventional manufacturing process, the bottom slitter is a cylinder having a marginal wall section which is tapered inwardly at an angle of about three degrees to provide a knife edge, and the cutting edge of the top slitter contacts the knife edge of the bottom slitter. When the bottom slitter is rotated by a shaft and motor means, the top knife is rotated in the opposite direction. The web is passed between the slitters and cut by the slitter.

A bottom slitter is manufactured either as a single unitary piece, or as two halves or semicircular members which is known in the industry as a split slitter or band. In the case of a split slitter, each half is placed on a drive shaft, the mating surfaces aligned, and the two members are then rigidly connected. However, for known slitters of this type the mating surfaces align the two parts in an axial direction only. Alignment for the second or radial direction is accomplished when the two halves are mounted on the shaft, which frequently does not give a true alignment because of the clearance between the mounting surface (inside cylindric surface of the slitter) and the mounting member. If the two halves are locked together in a misaligned state, any such misalignment can disturb the direction of cut and/or can result in frayed edges. The two halves must fit and be aligned in both a radial direction and in an axial direction. In order to better assure a proper alignment, and an alignment that can be maintained for some reasonable period of time, the mating surfaces typically have a tongue and groove arrangement or male and female keyways. Although this surface geometry has helped in maintaining alignment, subtle variations still occur which degrade the overall quality of the end product. This same problem exist for similar devices such as anvils and spacers.

A number of tongue and groove locking means or mechanisms have been proposed for joining and aligning two semicircular members. In this regard, attention is directed to the following U.S. Pat. Nos. 732,111; 744,917; 2,488,309; 3,659,490; 3,751,080; 3,889,553; 4,422,348; 4,637,807; and Re. 32,693; and British patent 2213 (01/30/03). However, no locking mechanism is disclosed by the prior art for the interegagement of two semicircular halves showing a means for alignment in both an axial and radial direction.

This invention has therefore as its purpose to provide a locking mechanism such as for a bottom slitter, anvil, band, spacer and the like with improved means for aligning and maintaining engagement of the two halves.

SUMMARY OF THE INVENTION

In accordance with the invention, a locking mechanism is provided for such devices as a bottom slitter, band, anvil, spacer, etc., typically constructed comprising first and second complementary, semicircular metallic members or two half-members. Each semi-circular member has two mating surfaces which are interengageable with the opposed two surfaces of the other member, and cooperate on engagement for radial and axial alignment to form an open-ended cylindrical body having wide marginal walls on opposed sides. In a preferred embodiment such as for use as a bottom slitter, each marginal wall for both members has a continuous circumferential groove, which align on engagement of the two half-members. For each half-member, one surface is the mirror image of the other. The two surfaces for one of the semi-circular members, i.e. the first semi-circular member, includes a first orthogonal recess at the outer periphery thereof extending the axial length thereof to provide a first female keyway, and a second orthogonal recess at the inner periphery thereof extending the axial length thereof to provide a second female keyway. Each surface for this first semi-circular member also includes a centrally disposed land to provide a male key. Each surface for the second half or second semi-circular member comprises orthogonal projections at the outer and inner peripheries of each surface to provide male keys, such that the projection at the outer periphery is complementary in shape and will mate with the aforesaid first orthogonal recess and the projection at the inner periphery is complementary in shape and will mate with the aforesaid second orthogonal recess, whereby on mating, said first and second members are referenced for fitting in a radial direction to inhibit radial movement thereof. Each surface of the second semi-circular member has a centrally disposed recess for receiving the complementary land disposed on each surface of the first member, whereby on mating the opposed surfaces, the first and second semi-circular members are referenced for fitting in an axial direction to inhibit axial movement thereof. An interconnecting means rigidly unites the first and second members.

In a preferred embodiment, the land for each of the surfaces of the first semi-circular member is provided with a threaded aperture having a longitudinal axis substantially normal to the plane of the surface and substantially tangential to the circumference of the member. Further, the recess of each surface for the second semi-circular member is provided with a slot or bore having its longitudinal axis substantially normal to the plane of the surface and substantially tangential to the circumference of the second member, and upon engagement of the two members, the bore of each recess aligns with the threaded aperture of each land when the surfaces are brought into mating engagement. A set screw or bolt member having a threaded section extends through the bore and threadedly engages the threaded aperture, thereby interconnecting the two half-members. In this manner, the two halves are rigidly united as a cylindrical body to further assure a more permanent alignment of the parts.

In another embodiment of the invention, the land for each of the surfaces of the first semi-circular member is rectilinear having two marginal sides substantially coaxial with the longitudinal axis of the cylindrical body and substantially flush with the longitudinal edges of the first and second recesses. The centrally disposed recess for each of the surfaces of the second member is rectilinear and extends the complete width of the marginal wall. In this manner, a tight engagement is achieved between surfaces.

DESCRIPTION OF THE DRAWINGS

FIG. 1 is a perspective view of a bottom slitter embodying the features of the present invention.

FIG. 2 is an exploded perspective view of the bottom slitter of FIG. 1.

FIG. 3 is a perspective longitudinal view of the top semi-circular half of FIG. 2.

DETAILED DESCRIPTION OF THE INVENTION

Figure 4:
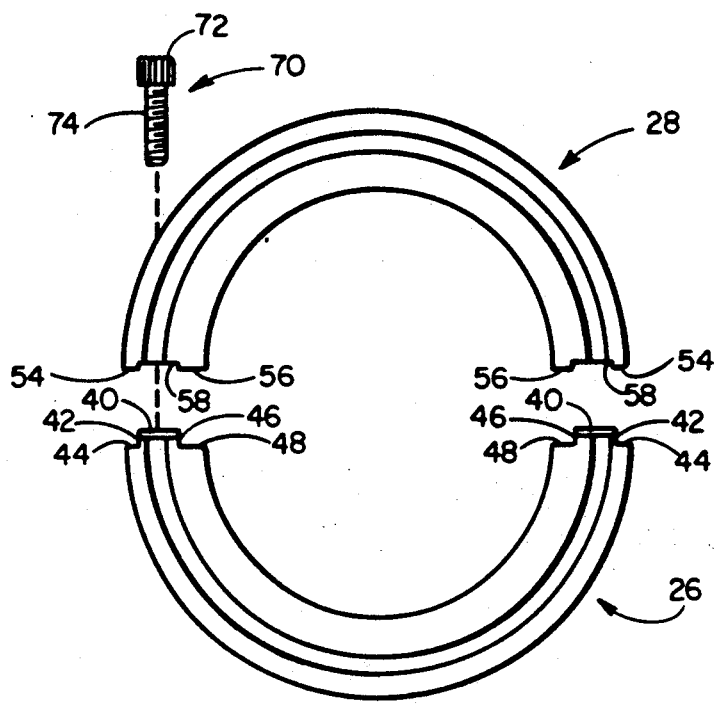
FIG. 4 is a side elevational view of the bottom slitter with the two halves separated to better illustrate the mating surfaces.
Figure 5:
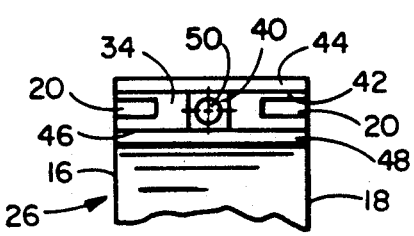
FIG. 5 is a plan view of one mating surface for a semi-circular member shown in fragmentary view.
Figure 6:
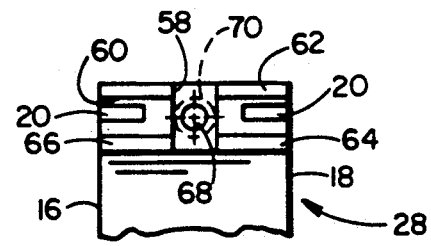
FIG. 6 is a plan view of the opposed mating surface for the other semi-circular member shown in fragmentary view.
Figure 7:
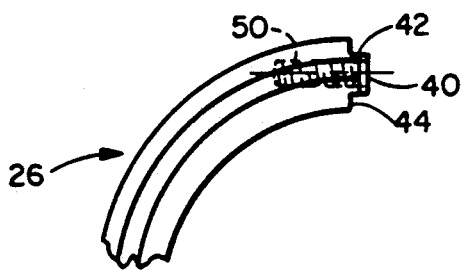
FIG. 7 is a side view of the member of FIG. 5.
Figure 8:
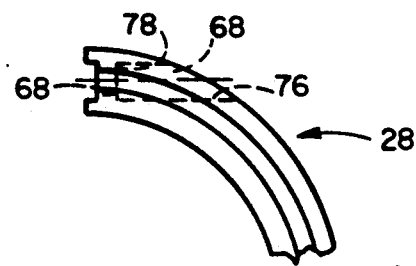
FIG. 8 is a side view of the member of FIG. 6.

Although the invention described below is with particular reference to a bottom slitter, it should be understood that the invention is also applicable to other devices requiring a locking mechanism, such as an avil, band or spacer. Referring to the drawings wherein like numerals refer to similar parts throughout the several views, there is shown in FIG. 1 a bottom slitter, indicated generally by the numeral 10, which has a cylindrical configuration having an outer cylindric surface 12 and an inner cylindric surface 14, and opposed marginal walls 16 and 18. It is typical to incline one or both of surfaces 16 and 18 at an angle of about three degrees, and therefore to provide knife edge 19. The opposed marginal walls have a circumferential groove 20 which serves as a dust or dirt groove so that the dust or dirt does not collect on the slitter. However, groove 20 can be omitted from the slitter. Outer cylindric surface 12 has an annular recess 22 to facilitate tooling, and inner cylindric surface 14 has an annular recess or bore relief 24 to provide relief so as to lessen contact with the shaft.

As shown in FIG. 2, the bottom slitter is comprised of two semi-circular members 26 and 28 that are interconnected to form the cylindrical body 10. Semi-circlular members 26 and 28 are joined at the mating surfaces, indicated generally by the numerals 30 and 32, respectively.

FIGS. 2 and 3 show in greater detail the features of the mating surfaces. Referring now to the first semi-circular member 26 having mating surface 30, it will be observed that for this member one mating surface is the mirror image of the other, and therefore the description of one surface will apply to the other surface as well. Surface 30 comprises planar region 34, first and second orthogonal opposed, peripheral recesses 36 and 38, respectively, and a centrally disposed land 40. First orthogonal recess 36 includes shoulder 42 and lateral wall 44 terminating at the outer perimeter of outer cylindric surface 14 of cylindrical body 10. In the illustrated embodiment, orthogonal recess 36 is positioned at the outer periphery of the surface and extends for the full axial length of the cylinder 10, and serves as a female keyway as explained below. The opposed side of planar surface 34 is provided with a second orthogonal recess 38, positioned at the inner periphery of the surface, having a shoulder 46 and lateral wall 48. Recess 38 extends the full axial length of the cylinder 10, and serves as a second female keyway. In the preferred embodiment, for the first recess 36 and second recess 38, the shoulders 42 and 46 are parallel and lateral walls 44 and 48 lay in a common plane to facilitate manufacturing.

Rectilinear land 40, centrally disposed on planar surface 34, has parallel, axial marginal edges substantially flush with shoulder 42 and 46, and parallel, radial marginal edges disposed inwardly from circumferential groove 20. Land 40 serves as the male key for surface 30. Thus it will be observed that each surface 30 for first semi-circular member 26 has two spaced apart axially disposed female keyways and one male key for mating with each of the surfaces 32 of second semi-circular member 28, as explained below in detail. Further, land 40 is provided with a threaded aperture 50 having an opening that is substantially parallel with the planar surface 34, and its longitudinal axis substantially normal to the planar surface and tangential with the circumference of the semi-circular member 26. Threaded aperture 50 does not extend to the outer cylindric wall 12, but terminates inwardly from the wall.

Referring now to the second semi-circular member 28 having surface 32, here too, one mating surface is the mirror image of the other, and therefore one surface only will be described but the same description applies to both. Surface 32 comprises planar region 52, first and second orthogonal, opposed peripheral projections 54 and 56, respectively, and a centrally disposed recess 58. As shown in the illustrative embodiment, projection 54, disposed at the outer periphery, includes a shoulder 60 and lateral wall 62 terminating at the perimeter of outer cylindric surface 12, and serves as a male key. Projection 56, disposed at the opposite or inner periphery, includes a shoulder 64 and lateral wall 66 terminating at the perimeter of inner cylindric surface 14, and also serves as a male key. Thus, it will be observed that projections 54 and 56 for each surface of the second semi-circular member are complementary in shape and will mate with the orthogonal recesses 36 and 38, whereby the two semi-circular members are referenced for fitting in a radial direction.

Rectilinear recess 58, centrally disposed on planar surface 52, is adaptable to receive land 40, and thereby serves as a female keyway. When the surface 32 is mated with surface 30, land 40 and recess 52 reference the two semi-circular members for fitting in an axial direction, thereby inhibiting axial movement. In the preferred embodiment, recess 58 extends the complete width of the marginal wall 16 terminating at the outer and inner cylindric surfaces 12 and 14, respectively. In this manner, projections 54 and 56 extend from the marginal wall to the radial marginal edges of recess 58, thereby interposing a space along the peripheral edges. Further, recess 58 is provide with an open-ended slot or bore 68 having the plane of its opening substantial parallel with the planar surface 52, and its longitudinal axis substantially normal to the planar surface and tangential with the circumference of second member 28. Bore 68 opens at its other end in outer cylindric wall 12 for accommodating an appropriate interconnecting member.

In the preferred embodiment, the two semi-circular members 26 and 28 are conjoined or interconnected by bolt member or set screw 70 having a head 72, such as with a hexagonal socket for accommodating an Allen wrench, and threaded shank 74. Bore 68 is provided with a section of enlarged diameter 76 terminating with shoulder 78, and on engagement of the two semi-circular members 26 and 28, set screw is turned until head 72 is seated against or abuts shoulder 78, thereby assuring a rigid connection.

For purposes of mating the surfaces of the semi-circular members, surface 30 comprises two female keyways and one male key, and surface 32 comprises two male keys and one female keyway, and the geometry of the female keyways is complementary to the geometry of the male keys. Because of this unique arrangement of over and under engagement of mating surfaces, the two female keyways of surface 30 and the male key of surface 32 reference the radial fitting thereby inhibiting radial misalignment; and the male key on surface 30 and the female keyway on surface 32 reference the axial fitting thereby inhibiting axial misalignment. Thus, the two semi-circular members 26 and 28 are conjoined at their mating surfaces by the sets of keys and keyways, one set for radial engagement and one set for axial engagement.

It will be observed that for a relatively wide slitter or the like it may be desirable or necessary to enlarge the span of the mating surfaces. Thus, each mating surface may be duplicated across the axial width thereof, including duplication of the interconnecting bolt member. In this manner, each mating surface is provide with a duplicate of all interlocking means, which facilitates obtaining a secure locking of the parts.

Figure 9:
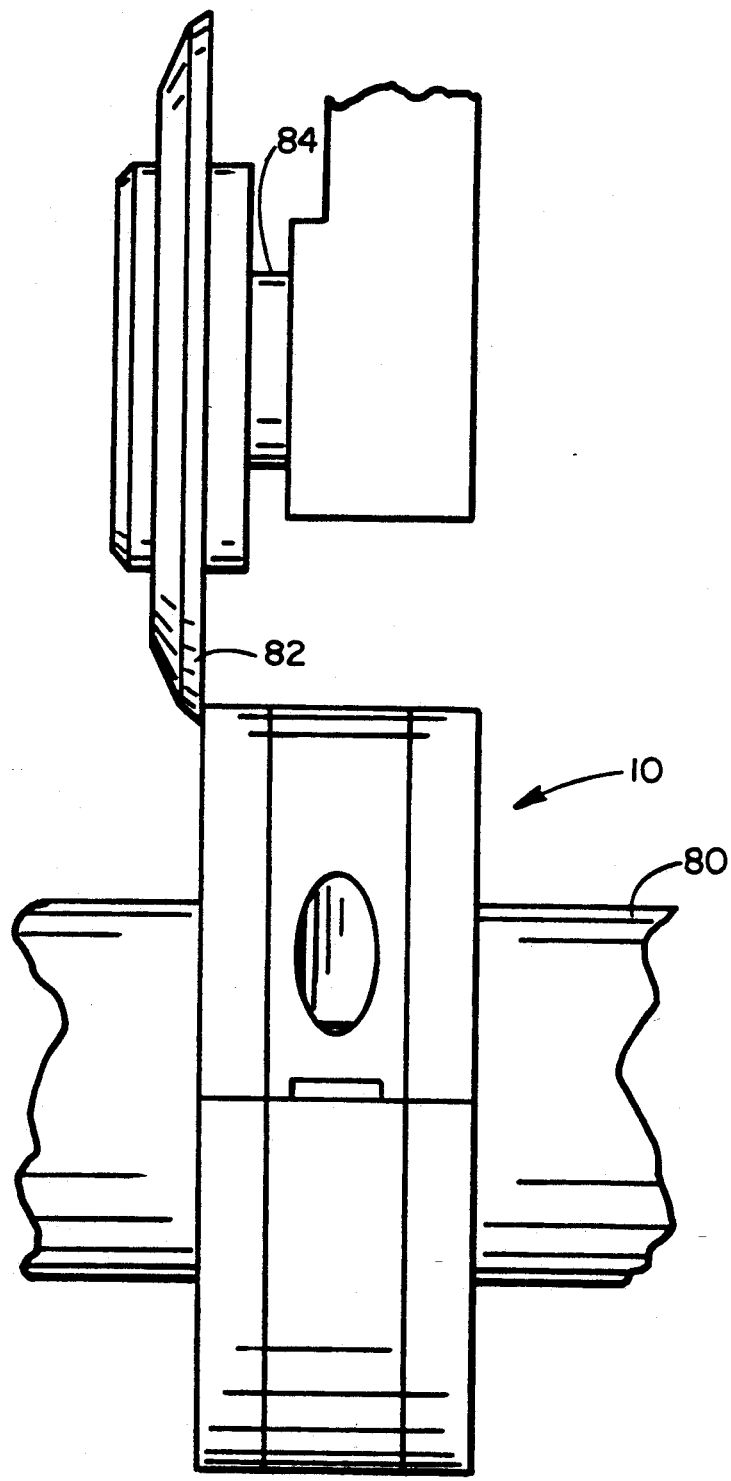
FIG. 9 is a schematic longitudinal view showing a cutting setup utilizing a bottom slitter of the present invention in conjunction with a top slitter.

In FIG. 9, there is shown a typical cutting set-up or arrangement for slitting a relatively wide web into smaller individual sheets or rolls. As shown, each half of a bottom slitter 10 is inserted onto a shaft 80, which may be driven by any appropriate means (not shown), and the two members are locked into position as by a bolt member described above. Top slitter 82, supported by a suitable shaft 84, is brought into contact with the bottom slitter so that cutting edge of top slitter 82 contacts the knife edge of bottom slitter 10. A web is passed between the two slitters and cut or slit at the point of contact.

It will be observed that the locking mechanism of our invention provides for bi-directional alignment of the two members when conjoined in that the parts are aligned axially and radially. Further, the two members can be readily assembled or removed from the drive shaft.

The foregoing detailed description has been given for clearness of understanding only, and no unnecessary limitations should be understood therefrom, as modifications will be obvious to those skilled in the art.

What is claimed is:

1. A locating mechanism, comprising: (a) first and second complementary, semi-circular metallic members, each of said members having two mating surfaces interengageable with the opposed two surfaces of the other member and cooperating for radial and axial alignment to form on engagement an open-ended cylindrical body having opposed marginal walls; (b) each of said surfaces of said first member being the mirror image of one another and having (i) a first orthogonal recess at the outer periphery thereof and extending the axial length thereof to provide a first female keyway, (ii) a second orthogonal recess at the inner periphery thereof and extending the axial length thereof to provide a second female keyway, and (iii) a centrally disposed land to provide a male key; (c) each of said surfaces of said second member being the mirror image of one another and having orthogonal projections at the outer and inner peripheries of the surface to provide male keys, said projection at the outer periphery being complementary in shape and mating with said first recess and said projection at the inner periphery being complementary in shape and mating with said second recess, whereby on mating, said first and second members are referenced for fitting in a radial direction to inhibit radial movement thereof; (d) said second member having a centrally disposed recess for receiving said land, whereby on mating, said first and second members are referenced for fitting in an axial direction to inhibit axial movement thereof; and (e) interconnecting means to rigidly unite said first and second members.

2. A locating mechanism according to claim 1 further including a continuous circumferential groove in the opposed marginal walls of each member which align on engagement of said members.

3. A locating mechanism according to claim 1 wherein said land of each of said surfaces of said first member is provide with a threaded aperture having a longitudinal axis substantially normal to the plane of the surface and substantially tangential to the circumference of the member, and the recess of each surface of said second member is provided with a bore for alignment with said threaded aperture of each of said lands, and said interconnecting means is a bolt member having a threaded section extending through said bore and threadedly engaging said threaded aperture.

4. A locating mechanism according to claim 1 wherein said land for each of said surfaces of said first member is rectilinear having two marginal sides substantially coaxial with the longitudinal axis of said cylindrical body and substantially flush with said first and second recess; and the recess for each of said surfaces of said second member is rectilinear and extends the complete width of said marginal wall.

5. A locating mechanism according to claim 1 wherein said cylindrical body has opposed parallel cylindric surfaces, each of said cylindrical surfaces having an annular recess, said annular recess being at least as wide as said land of said first member and said recess of said second member.

6. A locating mechanism as in any one of claims 1-5 in which said mechanism is a bottom slitter.

7. A locating mechanism as in any one of claims 1-5 in which said mechanism is an anvil.

8. A locating mechanism as in any one of claims 1-5 in which said mechanism is a spacer.

* * * * *